United States Patent [19]

Irie

[11] Patent Number: 5,049,222
[45] Date of Patent: Sep. 17, 1991

[54] METHOD AND APPARATUS FOR FEEDING MATERIALS IN A TIRE BUILDING MACHINE

[75] Inventor: Nobuhiko Irie, Nagasaki, Japan

[73] Assignee: Mitsubishi Jukogyo Kabushiki Kaisha, Tokyo, Japan

[21] Appl. No.: 357,595

[22] Filed: May 26, 1989

[51] Int. Cl.⁵ ...................... B29C 65/00; B29D 30/08
[52] U.S. Cl. .................................. 156/159; 156/123;
  156/266; 156/304.1; 156/406.4; 156/502;
  156/512
[58] Field of Search ............... 156/133, 134, 111, 123,
  156/124, 130, 130.7, 110.1, 152, 157, 159, 64,
  256, 266, 264, 304.1, 353, 361, 502, 507, 512,
  406, 405.1, 406.2, 406.4; 242/58.1–58.6, 55, 67.3
  R; 414/353, 398, 502, 507, 573, 574

[56] References Cited

U.S. PATENT DOCUMENTS

| 3,607,555 | 9/1971 | Leblond et al. | 156/406 X |
| 3,854,357 | 12/1974 | Kron | 152/502 X |
| 4,481,053 | 11/1984 | Tokuno et al. | 242/58.5 |
| 4,566,922 | 1/1986 | Martinez | 156/159 X |

FOREIGN PATENT DOCUMENTS 104303  4/1984  European Pat. Off. ......... 156/405.1

Primary Examiner—Michael W. Ball
Assistant Examiner—Geoffrey L. Knable
Attorney, Agent, or Firm—Wenderoth, Lind & Ponack

[57] ABSTRACT

A method for continuously feeding tire constituent materials in a tire fabricating machine includes the steps of positioning a second material truck holding a new roll of material at a standby location at the rear or to the side of a material feeder as aligned therewith, holding a trailing end portion of old rolled material being used for the tire production on a first material truck disposed in the material feeder before the material being used is consumed, delivering the first material truck when empty to the front, the side or the rear of the material feeder, transferring the second material truck holding the new roll of material into the material feeder from the rear or the side of the material feeder, delivering a leading end portion of the new rolled material on the second material truck once disposed in the material feeder up to a preselected position, splicing the trailing end portion of the old material being held to the leading end portion of the new material along a location where the respective end portions overlap with each other while releasing the trailing end portion, and successively repeating such steps. The present invention is also drawn to apparatus for carrying out the above method.

3 Claims, 11 Drawing Sheets

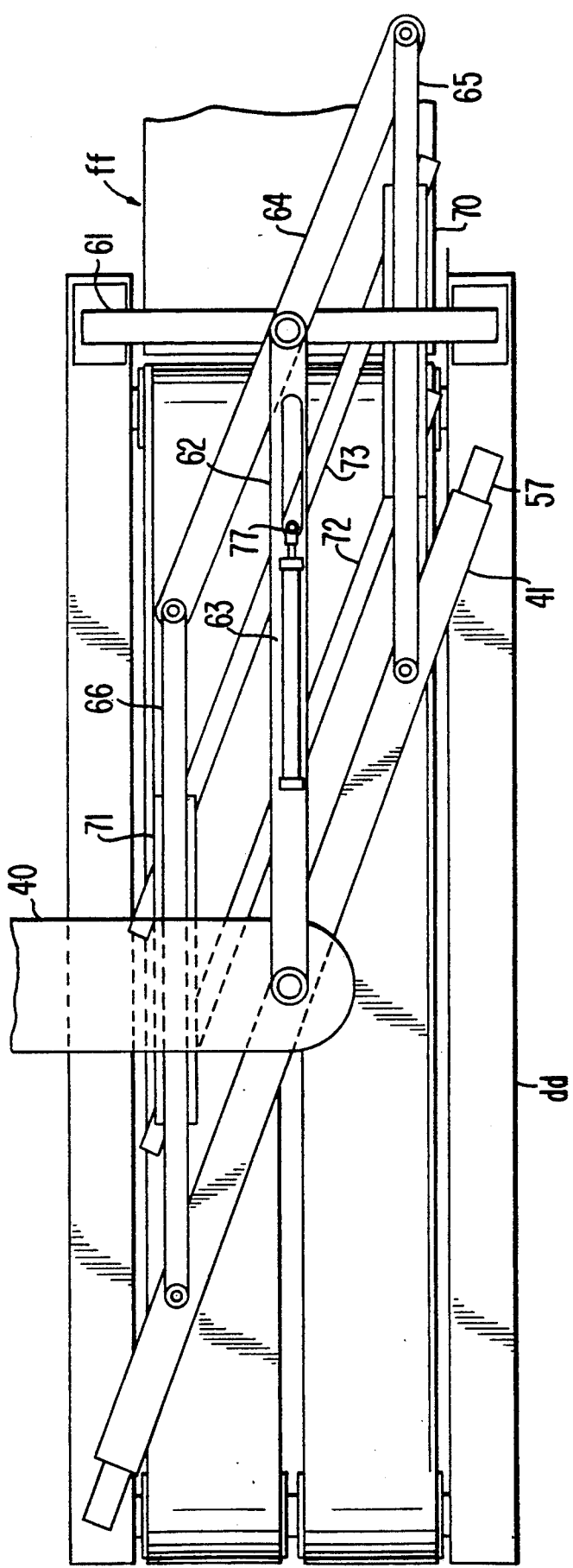

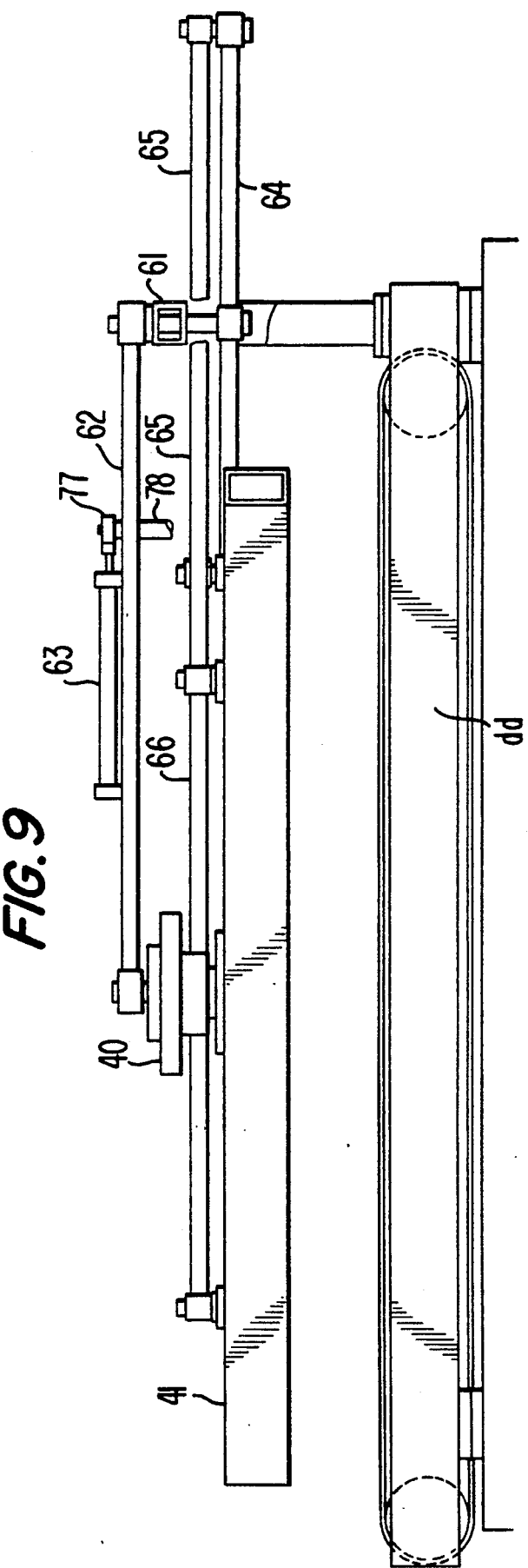

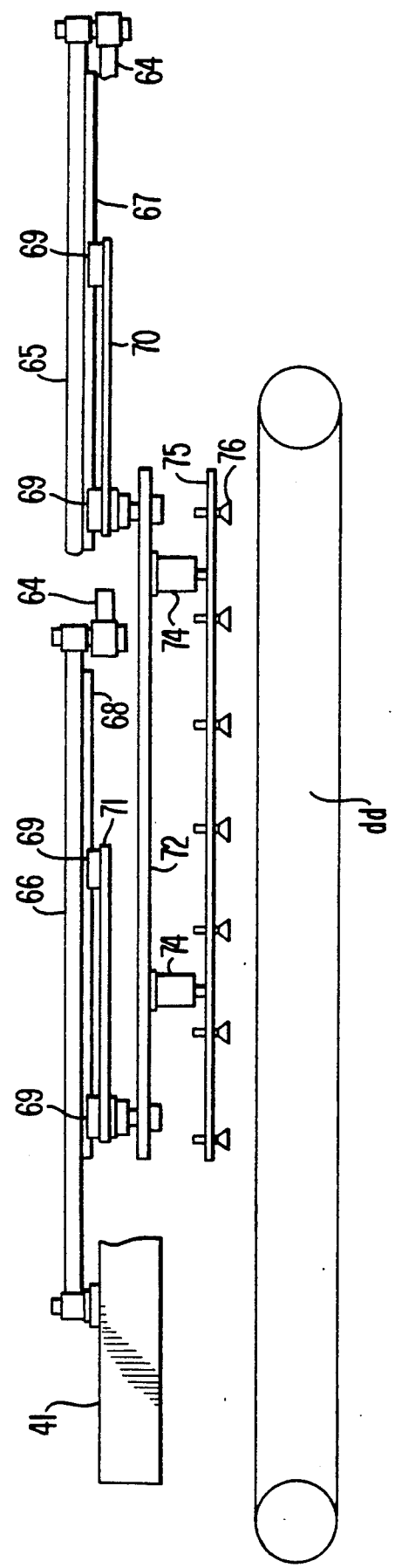

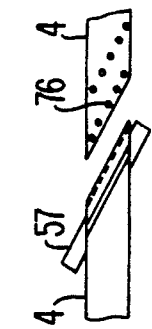
FIG.11(a)
FIG.11(b)
FIG.11(c)
FIG.11(d)
FIG.11(e)
FIG.11(f)
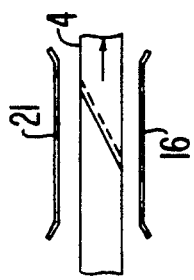
FIG.11(g)
FIG.11(h)
FIG.11(i)
FIG.11(j)
FIG.11(k)
FIG.11(l)
FIG.11(m)
FIG.11(n)
FIG.11(o)

METHOD AND APPARATUS FOR FEEDING MATERIALS IN A TIRE BUILDING MACHINE

BACKGROUND OF THE INVENTION

1. Field of the Invention

The present invention relates to a method and an apparatus for continuously feeding materials in a tire fabricating machine.

2. Description of the Prior Art (1) In one known method for feeding materials in a tire fabricating machine in the prior art, material in a rolled shape is delivered for a tire fabricating machine as loaded on a truck and is left there. If the material is consumed during a tire producing operation, an operator stops the tire producing work, takes out the used unnecessary roll and disposes a new roll of material in a material feeder of the tire building machine. A liner wound jointly with the material is rewound and wrapped around a liner take-up roll in the material feeder. Then terminal treatments are carried out on the new and old materials, and the new and old materials are spliced to each other.

(2) Or else, in another known method, a truck provided with a co-wound roll of a material and a liner, a liner take-up roll and a necessary intermediate roll is delivered to a tire fabricating machine and is left there. If the material is consumed during a tire producing operation, an operator stops the tire producing operation and removes the used material truck. A new material truck is then delivered. A leading end of new material is derived from the co-wound material roll. Then terminal end treatments for the new and old materials are performed, and the new and old materials are spliced to each other.

(3) Although the above-mentioned known methods (1) and (2) constitute partly automated methods in that a material truck is delivered in an unmanned fashion and is left at a predetermined location, the work of aligning a used material truck and a new material truck and the exchange thereof are carried out by a worker in the tire fabricating machine while production is stopped.

As will be apparent from the above description of the known methods in the prior art, extremely inefficient measures have been employed heretofore for exchange of rolled materials. Consequently, a real operation time for production is relatively small, and the material feeding system exhibits poor productivity.

SUMMARY OF THE INVENTION

It is therefore one object of the present invention to provide an improved method for feeding materials in a tire fabricating machine in a very efficient manner without necessitating an interruption in production.

Another object of the present invention is to provide an improved apparatus for feeding materials in a tire fabricating machine, which can operate entirely automatically to practice the method according to the present invention.

According to one feature of the present invention, there is provided a method for feeding materials in a tire fabricating machine, in which materials are continuously fed by repeating the steps of positioning a second material struck holding a new roll of material at a standby location at the rear or to the side of a material feeder as aligned therewith, holding a trailing end portion of old roller material being used for the tire production on a first material truck disposed in the material feeder before the old material being used is consumed, delivering the first material truck when empty to the front, the side or the rear of said material feeder, transferring the second material truck holding the new rolled material into the material feeder from the rear or the side of the material feeder, delivering a leading end portion of the now rolled material on the second material truck once disposed in the material feeder to a preselected position, and splicing the trailing end portion of the old material being held to the leading end portion of the new material along a location where the respective end portions overlap with each other while releasing the trailing end portion.

According to another feature of the present invention, there is provided the above-featured method for feeding materials in a tire fabricating machine, which further includes the steps of detecting that the spliced portion has reached a cutter position in the material feeder, cutting the material at the front and the rear of the spliced portion in response to the detection, discharging a cut piece of the material, and resplicing the cut end portions with each other.

According to still another feature of the present invention, there is provided an apparatus for feeding materials in a tire building machine, comprising: a plurality of material trucks each including a sled-shaped frame adapted to move on roll or ball bearings disposed on a floor, and a support member for supporting a material roll in which a tire constituent material and a liner are cowound, a separate roll for separating the material and the liner paid out from the material roll, a liner roll for taking up the liner separated by the separate roll, and a guide member for supporting and guiding the separated material thereon, all provided on the frame; and material suctioning and holding means provided at the location where a material truck being used for production is disposed, and having a swingable arm provided with vacuum pads at its free end portion which can suction and hold the material on the guide member.

More particularly, the apparatus for feeding materials in a tire building machine according to present invention is improved with respect to the following points.

(1) A material truck is characterized as follows:
  (i) For the convenience of automatic control of the truck in the neighborhood of the material feeder, a sled-shaped truck is employed. Roller groups are disposed in the neighborhood of the material feeder and the tire fabricating machine to enable the material truck to be freely diverted with respect to its traveling direction.
  (ii) For aligning a trailing end portion of preceding roller material and a leading end portion of succeeding roller material, there is provided a material aligning device in which the respective end portions can be aligned by means of a drive unit on the side of the material feeder.

(2) An arm is provided at a material inlet portion of a material feeder, whereby it is possible to suction a trailing end portion of roller material by means of a suction device provided on the same arm and to splice it with a leading end portion of new rolled material.

(3) A cutting device of a material feeder is characterized as follows:
  (i) There is provided a detecting device for detecting the fact that the portion spliced provisionally through the process described in paragraph (2) above has reached a predetermined location.

(ii) There is provided a material suction device, which at first cuts the rear side (the side nearer to the roll on the material truck) of the provisionally spliced portion, then suctions the material on the rear side of the cut line, rises and retreats.

(iii) There is provided a discharging device which, after suctioning the above-mentioned material, moves the provisionally spliced portion rearwardly and then cuts the material at the front of the provisionally spliced portion. After such cutting is carried out, the discharging device approaches and suctions the cut piece, rises and moves in the widthwise direction of the material to discharge the suctioned cut piece to the outside of the cutting device.

(iv) There is provided a finished device which, after the cutting and the discharging above are carried out, moves the suction device forwards, and lowers to overlay the rear cut end portion of the material on the front cut end portion in a favorable condition. After releasing the suction, the finishing device presses the overlapped portions to finish the splicing thereof.

The apparatus for feeding materials in a tire building machine according to the present invention having the above-mentioned improved construction operates in the following manner:

(1) A plurality of tire constituent material trucks are arrayed in the neighborhood of a material feeder of a tire fabricating machine to be held in a standby state.

(2) During operation, it is detected that material on a material truck that is being used has been consumed.

(3) A trailing end of the material is disengaged from the material truck and is held automatically.

(4) The emptied material truck is taken out from the material feeder.

(5) A new material truck is delivered from a standby state to the material feeder.

(6) A leading end of new material is derived from a material roll on the new material truck.

(7) The trailing end of the old material and the leading end of the new material are provisionally spliced, and the spliced materials are automatically conveyed to a cutting device in the material feeder.

(8) In the cutting device, the spliced material is cut respectively at the front and at the rear of the provisionally spliced portion, and the cut-out provisionally spliced portion is discharged.

(9) The cut end portions produced as a result of the operation in paragraph (8) above are spliced with each other, whereby the feeding of the tire constituent materials can be carried out continuously without relying upon human labor.

Consequently, according to the present invention, the exchange of material trucks, terminal end treatments of end portions of new and old materials, and even a splicing of new and old materials, which relied upon human labor in the prior art, can be achieved entirely through an automatic operation according to the present invention. Thus, an installation facilitating a high productivity can be provided.

The above-mentioned and other objects, features and advantages of the present invention will become more apparent by reference to the following description of one preferred embodiment of the invention taken in conjunction with the accompanying drawings.

BRIEF DESCRIPTION OF THE DRAWINGS

In the accompanying drawings:

FIG. 8 is a plan view of the cutting device and a suction device;

FIG. 9 is a side view of the devices shown in FIG. 8;

FIG. 10 is a detailed side view of the suction device; and

FIGS. 11(a) to 11(o) are schematic plan views showing successive steps of a splicing process for new and old tire constituent materials.

DETAILS DESCRIPTION OF THE PREFERRED EMBODIMENT

Figure 1:
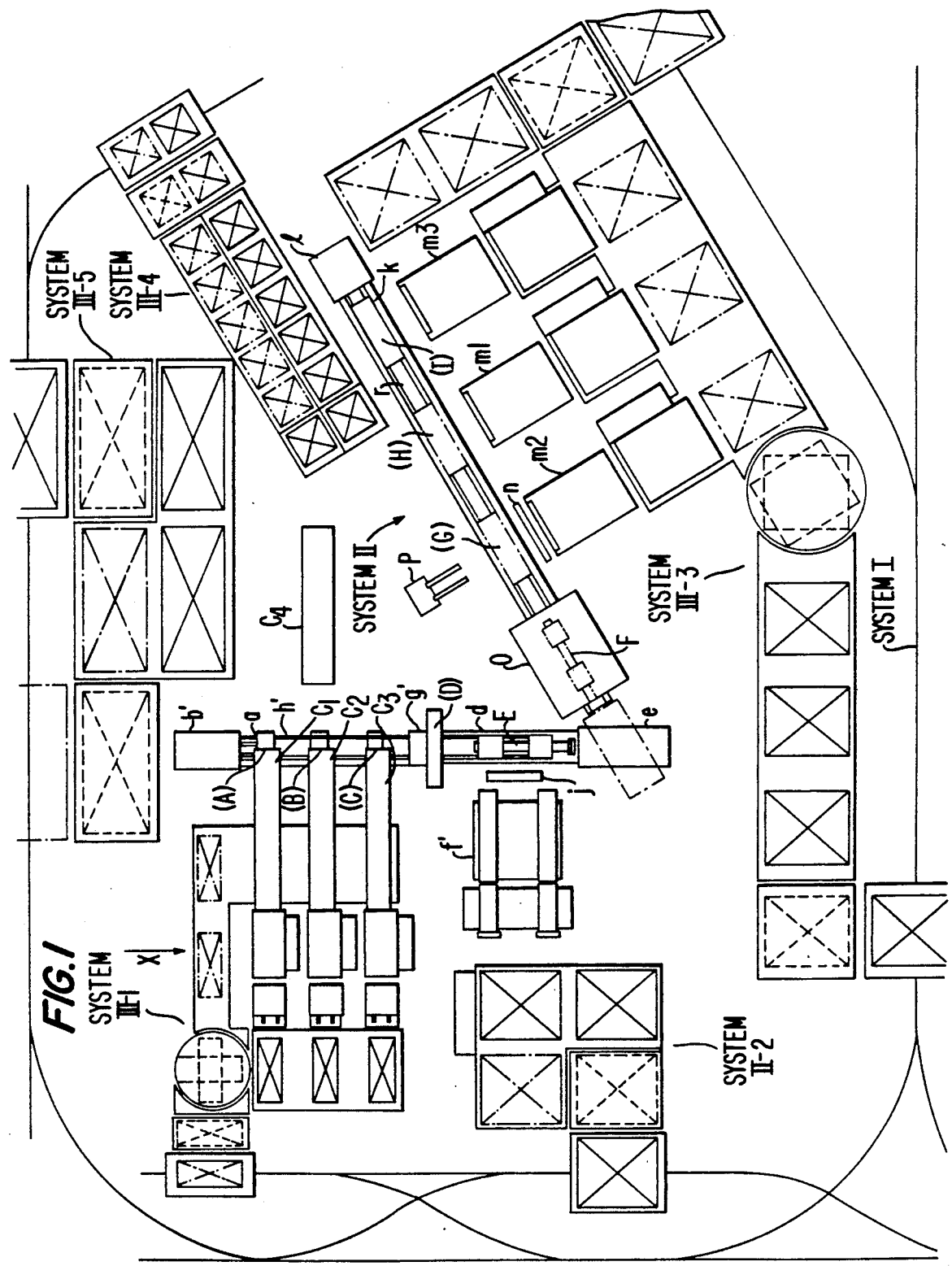
FIG. 1 is a general plan view of in one preferred embodiment of a tire fabricating machine according to the present invention.

FIG. 1 shows, in general, an apparatus for feeding tire constituent materials according to one preferred embodiment of the present invention. The apparatus consists of an automatic conveyor system I for delivering material trucks, an automatic exchanger system III for automatically aligning delivered material trucks and automatically replacing a used material truck, and a tire fabricating system II adapted for use with system III. The system I is a known automatic conveyor system, for example, making use of electromagnetic induction, which is equipped with a loading/unloading device adapted for conveying, loading and unloading tire constituent material trucks.

The constituent components of system II illustrated in FIG. 1 are as follows:

Reference character a designates a belt-tread structure building drum;

Reference character b' designates a movable frame for supporting the above-mentioned drum a;

Reference character $C_1$ designates a material feeder (for a first-layer breaker ply);

Reference character $C_2$ designates a material feeder (for a second-layer breaker ply);

Reference character $C_3$ designates a material feeder (for a third-layer breaker ply);

Reference character d designates a carcass building drum;

Reference character e designates a turntable for supporting the above-mentioned drum d;

Reference character f' designates a material feeder (for a side wall);

Reference character g' designates a carrier for carrying a belt-tread structure;

Reference character h' designates rails for guiding the movable frame b' of the drum a and the carrier g;

Reference characters i and j designate press-sticking devices;

Reference character k designates a carcass band building drum;

Reference character l designates a movable frame for supporting the above-mentioned drum k;

Reference character $m_1$ designates a material feeder (for an inner liner);

Reference character $m_2$ designates a material feeder (for a first-layer carcass ply);

Reference character $m_3$ designates a material feeder (for a second-layer carcass ply);

Reference character n designates a press-sticking device;

Reference character o designates a carcass-band carrier;

Reference character p designates a bead feeder;

Reference character r designates rails for guiding the drum frame 1 and the carrier o;

Reference characters (A) and (B) designate movement stop positions of the drum a;

Reference character (C) designates another movement stop position of the drum a and a stop position of the carrier g';

Reference character (D) designates another stop position of the carrier g';

Reference character (E) designates still another stop position of the carrier g' and a turn stop position of the drum d;

Reference character (F) designates another turn stop position of the drum d and a stop position of the carrier o; and References (G), (H) and (I) respective designate movement stop positions of the drum k and an advance stop position of the bead feeder p.

Figure 2:
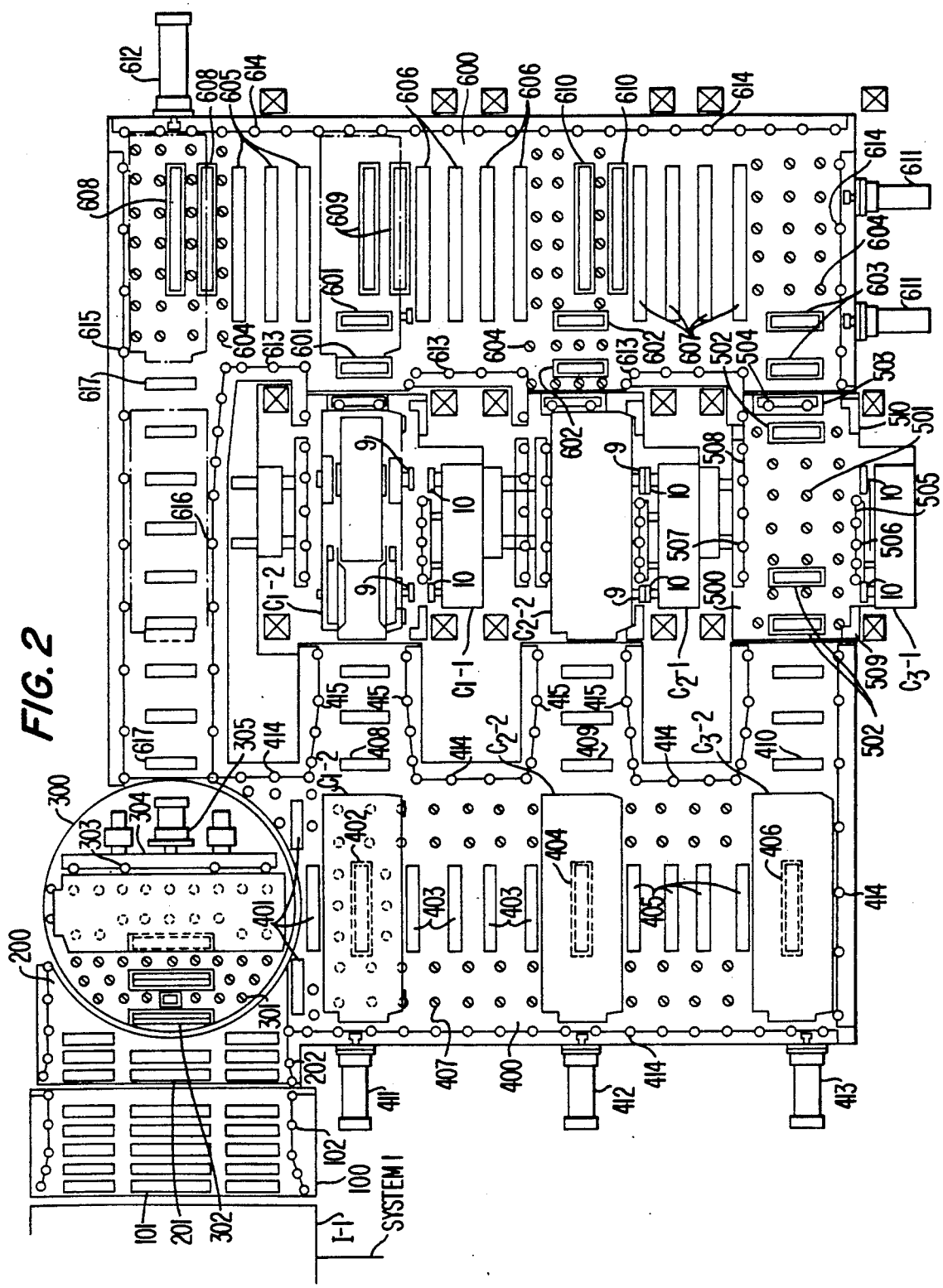
FIG. 2 is a detailed enlarged plan view of System III-1 in FIG. 1.

The constituent components of the system III illustrated in FIGS. 1 and 2 are as follows.

A sub-system (III-1) receives material trucks carrying breaker plies which have been automatically delivered by the system I, diverts the trucks (if necessary), then align the material trucks at a standby position at the rear of the respective material feeders $C_1$, $C_2$ and $C_3$, also delivers used material trucks forwards, and subsequently transfers a material truck from the standby position to a predetermined position in the material feeder. Also, it moves sideways and aligns the above-described used material truck delivered forwards, and is adapted to cause a transport car of system I to collect the used material trucks at an appropriate time.

A sub-system (III-2) receives material trucks for carrying side walls which have been automatically delivered by the system I, then aligns the material trucks at a standby position to the side of the material feeder f', also delivers used material trucks backwards, and subsequently transfers a material truck from the standby position to a predetermined position in the material feeder. On the other hand, it moves sideways the above-mentioned used material trucks delivered backwards, aligns the same, and is adapted to cause the transport car of system I to collect the used material trucks at an appropriate time.

A sub-system (III-3) receives material trucks carrying carcass plies and an inner liner which have been automatically delivered by the system I, then aligns the material trucks at a standby position, also delivers used material trucks backwards, and subsequently delivers the trucks sideways and aligns the same. One the other hand sub-system (III-3) moves material trucks from the standby position to the rear of the material feeder, aligns the trucks, and transfers the trucks from the rear of the material feeder to a predetermined position. In addition, sub-system (III-3) is adapted to cause the transport car of system I to collect the used material trucks at an appropriate time.

A sub-system (III-4) receives material trucks carrying beads which have been automatically delivered by the system I, after alignment, delivers them sequentially forwards, and the beads are taken out at a position most favorable for a worker. Once emptied, the material trucks are delivered sequentially to the above-mentioned receiving station, and they are adapted to be collected by the transport car of system I at an appropriate time.

A sub-system (III-5) receives material trucks for carrying treads which have been automatically delivered by the system I, and after alignment, moves them to an active position or to a standby, position. The treads are taken out by a worker, and once the material truck is emptied, it is brought to an empty truck collection standby position where the empty truck is adapted to be collected by the transport car of system I.

According to the construction and arrangement of the system I, system II and system III illustrated in FIG. 1, it will be appreciated that the automatic transfer car is adapted to collect used material trucks after it has delivered material trucks.

Since the sub-systems (III-1) to (III-3) are similar to one another, a detailed description of these subsystems will be made, by way of example, in connection with sub-system (III-1).

FIG. 2 is an enlarged plan view of subsystem (III-1). In order to facilitate an understanding of the construction of the sub-system, in connection with the material feeders $C_1$, $C_2$ and $C_3$, only material trucks $C_1$-2, $C_2$-2 and $C_3$-2 and drive units $C_1$-1, $C_2$-1 and $C_3$-1 therefor are illustrated.

Figure 3:
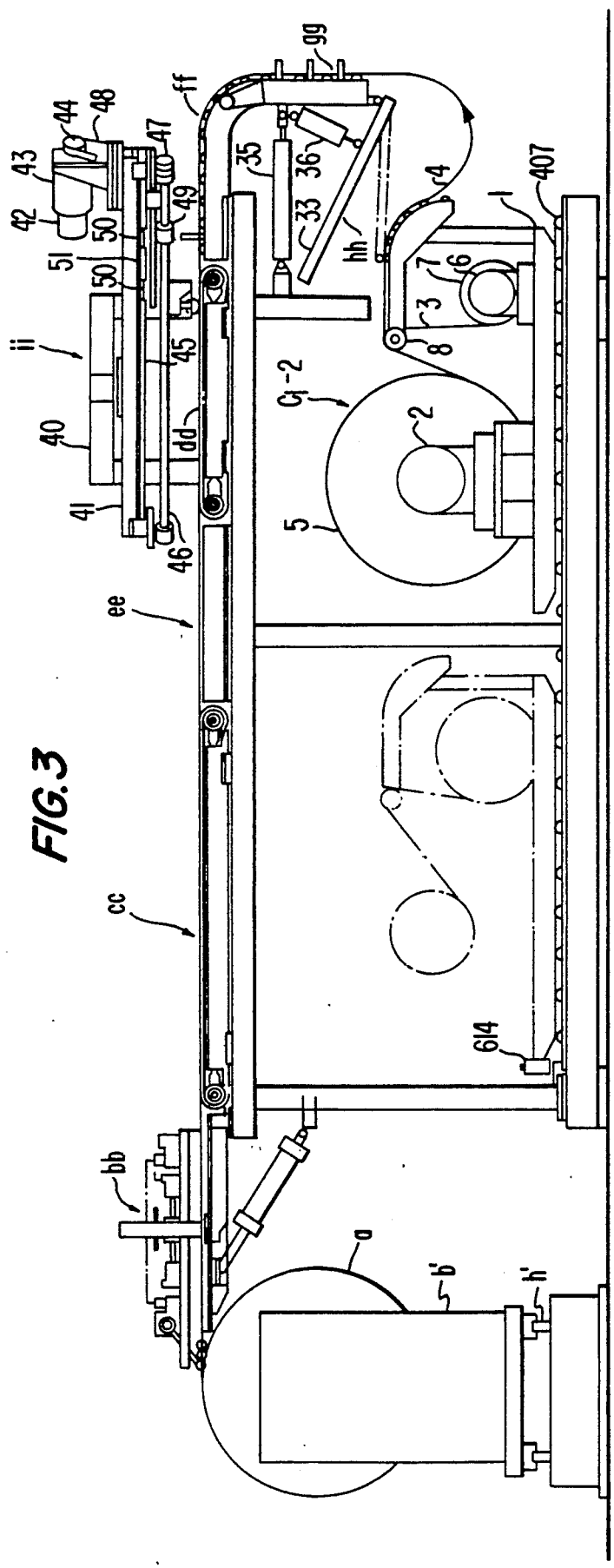
FIG. 3 is a side view of a material feeder in System III-1 as viewed in the direction of arrow X in FIG. 1.

FIG. 3 is a side view of sub-system (III-1) as viewed in the direction of arrow X in FIG. 1, and therefor also shows a side view of the material feeders $C_1$, $C_2$ or $C_3$.

Figure 4:
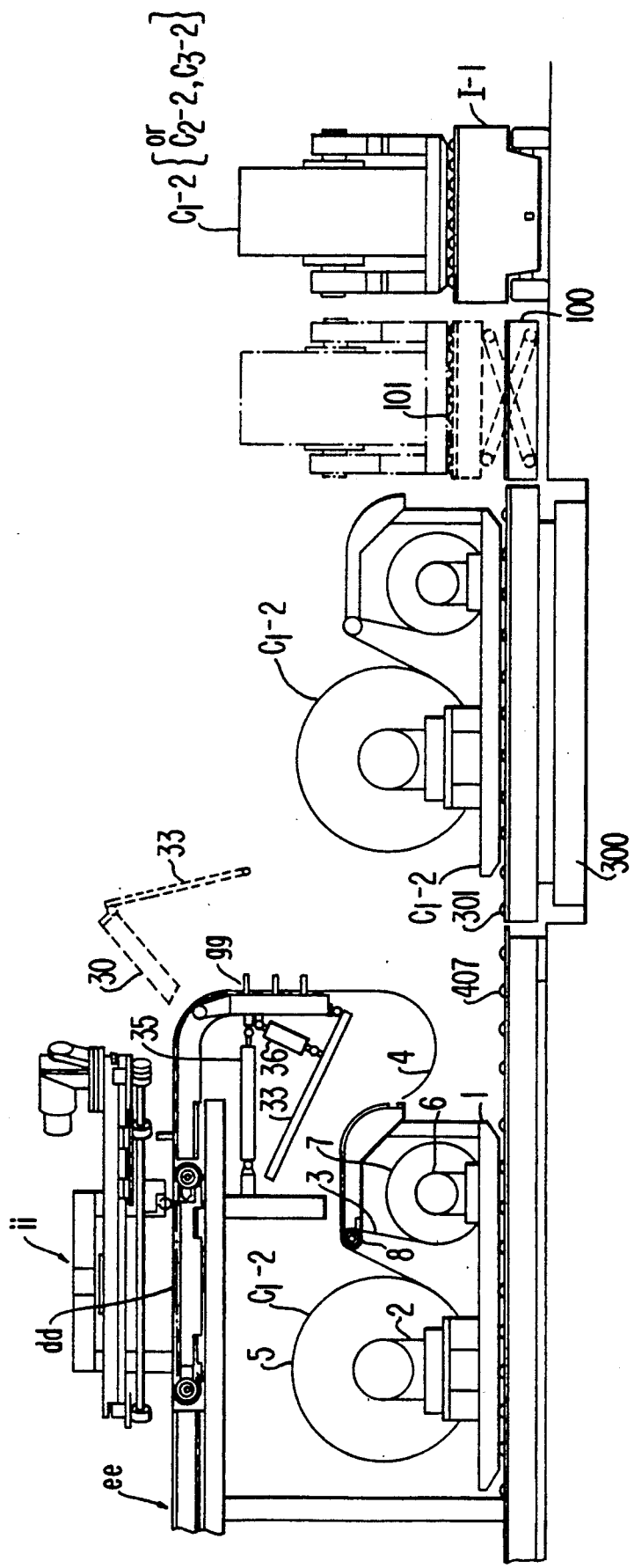
FIG. 4 is a side view of material trucks.

FIG. 4 is a side view of the material trucks.

In the following, detailed description will be made in sequence with respect to the sub-system (III-1), the material truck and the material feeder.

The sub-system (III-1) is constructed of the following components:

100 ..... a reception conveyor device;
200 ..... a transfer conveyor device;
300 ..... a turntable device;
400 ..... a material truck feed conveyor device;
500 ..... a material truck exchanger device and;
600 ..... a material truck discharge conveyor device.

In addition, FIG. 2 shows material feed drive units $C_1$-1, $C_2$-1 and $C_3$-1 provided in the material feeders $C_1$, $C_2$ and $C_3$, respectively, material trucks $C_1$-2, $C_2$-2 and $C_3$-2 and used material trucks (indicated by dash-dot lines). In addition, the turntable 300 is shown in the state where it has just received a material truck thereon, and on the feed conveyor 400 are material trucks in a feed standby state. The material truck exchanger device 500 for the material feeder $C_1$ is shown in the state immediately after it has received feed of the material truck $C_1$-2, where the material truck $C_2$-2 is being used, where the material truck exchanger device 500 is about to receive the material truck $C_3$-2.

Now, the respective devices will be explained in greater detail below.

Reception Conveyor Device 100

As shown in FIG. 4, the reception conveyor device 100 is of the vertically movable type (publicly known) so as to be convenient for receiving the material truck $C_1$-2, $C_2$-2 or $C_3$-2. The top surface of this device 100 is provided with a plurality of sets of drive rollers 101 which are parallel to drive rollers on the top surface of a transport car I-1 of system I. The top surface of these rollers 101 is flush with the roller top surface of the transport car I-1 when the reception conveyor device 100 is held at the limit of ascendance, while it is flush with the drive roller top surface of the transfer conveyor device 200 as will be described later when the reception conveyor device 100 is held at the limit of descendance. Although not illustrated, there is also provided a positioning device for positioning the material truck after its reception at conveyor device 100. In addition, on the top surface of the reception conveyor device 100 are provided a plurality of guide rollers 102.

Transfer Conveyor Device 200

The transfer conveyor device 200 is disposed between the above-described reception conveyor device 100 and the turntable device 300 as will be described later. This conveyor device 200 also comprises a plurality of drive rollers 201 disposed in parallel to the above-described drive rollers 101, and guide rollers 202.

Turntable Device 300

The turntable device 300 is adapted to be operated appropriately so as to reciprocate between the position shown in FIG. 2 and a position rotated by 90° in the counterclockwise direction from the illustrated state. On the top surface of the turntable are fixedly provided a plurality of ball bearings 301 which can rotate in any direction in which the axes of rotation remain horizontal. There are provided a plurality of sets of drive rollers 302 which are disposed parallel to the above-described drive rollers 201 and which can be arbitrarily moved up and down on the turntable device 300. The turntable device 300 is also provided with a bracket 304 supporting guide rollers 303 so as to be movable in the back and forth directions. With the above-mentioned construction, a material truck delivered by the transport car I-1 is transferred onto the reception conveyor device 100 by means of drive rollers on the transport car and the drive rollers 101. Then the material truck is lowered to the same level as the transfer conveyor device 200, and by driving the above-mentioned rollers 101, rollers 201 and rollers 302, it is transferred to the turntable device 300. After the turntable device rotates and after 90° turn, if the rollers 302 are rotated in the reverse direction to the above-described rotational direction, the material truck can be transferred to the feed conveyor 400 as will be described later.

Material Truck Feed Conveyor Device 400

The material truck diverted and delivered by the above-described turntable device 300 can be transferred to a predetermined position by selectively driving the drive rollers 401 to 406. The drive rollers 402, 404 and 406 are movable in the vertical directions. Reference numeral 407 designates ball bearings which can freely rotate in any direction in which the axes of rotation remain horizontal. Reference numerals 414 and 15 designate respective guide roller groups. Reference numerals 408, 409 and 410 designate drive rollers disposed in the perpendicular direction to the above-described drive rollers 402-406. Reference numerals 411, 412 and 413 designate cylinders which are used to push the material trucks $C_1$-2, $C_2$-2 and $C_3$-2, respectively, towards the drive rollers 408, 409 and 410 when these material trucks are located at the positions illustrated in FIG. 4, while the above-mentioned rollers 402, 404 and 406 assume lowered positions and are not held in contact with the bottoms of the trucks. With the above-mentioned construction, the material trucks delivered from the turntable device 300 can be stopped, respectively, at predetermined positions and can be arbitrarily sent out in the perpendicular direction.

Material Truck Exchanger Device 500

The exchanger device 500 will be explained in relation to the material feeder $C_3$. With regard to the other material feeders $C_1$ and $C_2$, the construction of the exchanger device 500 is identical.

Reference numeral 501 designates a group of ball bearings which can arbitrarily rotate in any direction in which the axes of rotation remain horizontal, and reference numeral 502 designates drive rollers which can move up and down. Reference numeral 503 designates a vertically movable positioning device provided with guide rollers 504. The rollers 502 and 504 are disposed so as to be lower than the top surfaces of the ball bearings 501 when they are located at the lower limit positions.

Reference numeral 505 designates a lateral pusher device which is provided with guide rollers 506 and is able to move back and forth toward and away from the above-described pusher device 502. Also, there is provided another lateral pusher device 508 disposed opposite the lateral pusher device 505 and provided with guide rollers 507. In addition, there are provided positioning blocks 509 and 510 adapted to fit with inclined surfaces provided at the bottom of the material truck. The above-mentioned positioning blocks 509 and 510 prevent the material truck from displacing during operation after the material truck has been set in position, and also maintains correct connecting conditions between the roll shafts on the truck side and the output shafts of the respective drive units $C_1$-1, $C_2$-1 and $C_3$-1.

With the above-mentioned construction, the material truck $C_3$-2 which has advanced as driven by the drive rollers 410 is stopped by the guide rollers 504 held at the raised position. The drive rollers 502 are then lowered. Subsequently, the material truck $C_3$-2 is fitted between the positioning blocks 509 and 510 by the lateral pusher device 508, and so, is held in position without being displaced during operation and it becomes possible to deliver the material carried thereon. At the end of the operation, the above-mentioned lateral pusher device 508 is retracted, the aforementioned lateral pusher device 505 is actuated, the above-described positioning device 503 is retracted, and the drive rollers 502 are raised and driven Then, the material truck can be delivered forwards.

Material Truck Discharge Conveyor Device 600

The material truck discharge conveyor device 600 consists of drive rollers 601, 602 and 603 which are vertically movable and serve to further forward the material trucks sent out from the respective exchanger devices, ball bearings 604 which are rotatable in any direction in which the axes of rotation remain horizontal, drive rollers 605, 606 and 607 disposed perpendicularly to the above-mentioned drive rollers 601, 602 and 603, drive rollers 608, 609 and 610 which are vertically movable, pusher cylinders 611 and 612, guide rollers 613, 614, 615 and 616, and drive rollers 617 disposed perpendicularly to the aforementioned drive rollers 608.

With the above-described construction, the material truck delivered forwards from the exchanger device of the material feeder $C_3$ is made to advance by the drive rollers 603 until it strikes against the guide rollers 614. After the truck has been stopped the drive rollers 603 are lowered, if it is laterally pushed by the cylinders 611, the material truck is transferred to the drive rollers 607 and is moved sequentially by the rollers 607, 610, 606, 609, 605 and 608 until it strikes against the guide rollers 615. Thereafter, if the rollers 608 are lowered and the material truck is pushed out by the cylinder 612, the material truck is transferred to the drive rollers 617 and can be sent further forwards, and it can be stopped at any arbitrary position. The material trucks delivered from the material feeders $C_2$ and $C_1$ are also, if similar procedures are executed, conveyed in a similar manner up to the turntable position.

At an appropriate time, the material truck is transferred to the turntable, the material truck is diverted and the material truck is delivered to the reception conveyor via the transfer conveyor. Then if the transfer conveyor is raised, the used material truck can be delivered to the automatic transport car.

In FIGS. 3 and 4 are shown a material truck $C_1$-2 ($C_2$-2 and $C_3$-2 being similar) and a material feeder $C_1$ ($C_2$ and $C_3$ being similar), and their correlation with the material truck automatic exchange system III.

Figure 5:
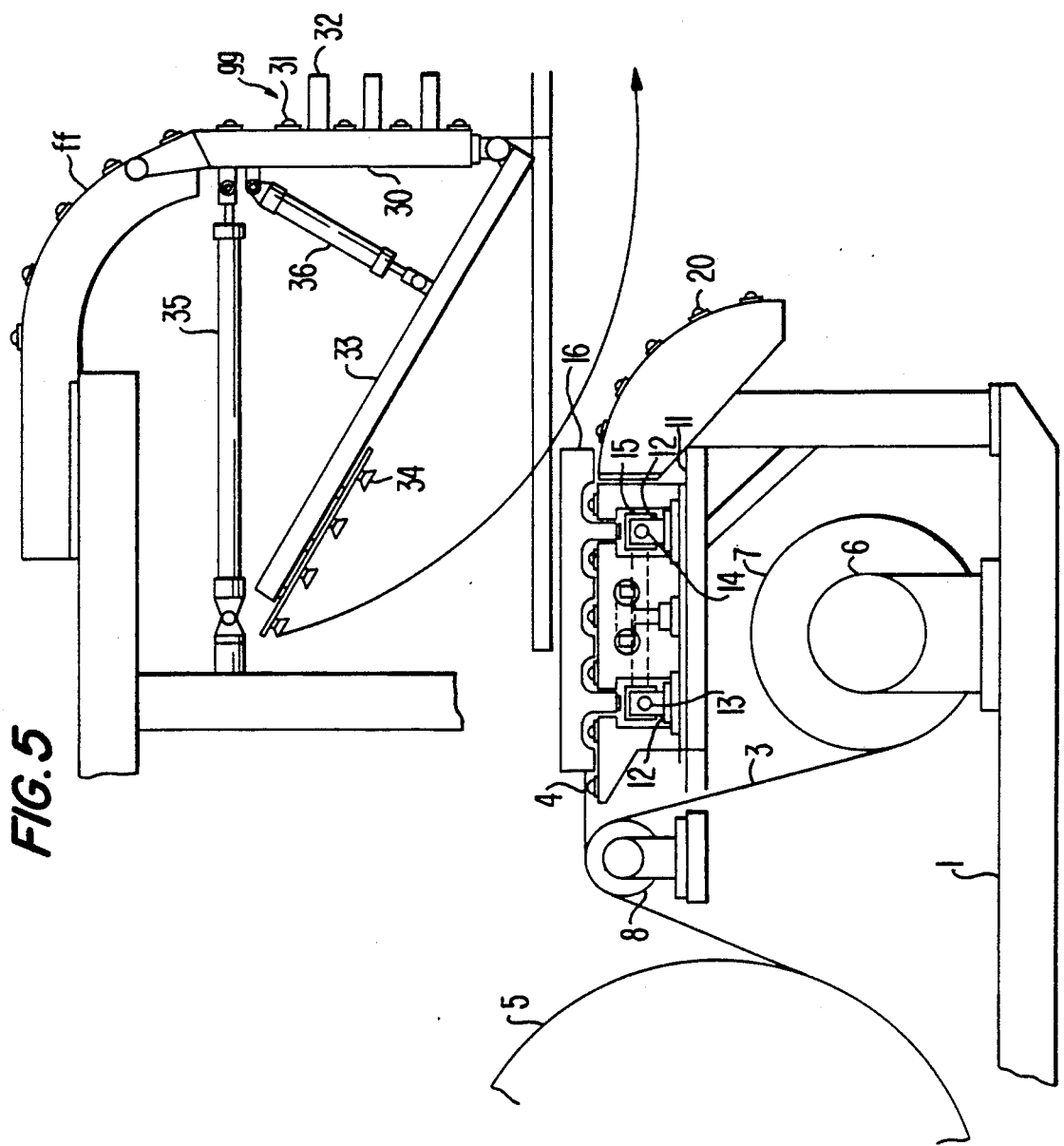
FIG. 5 is a side view of a material aligning device of a material truck.
Figure 6:
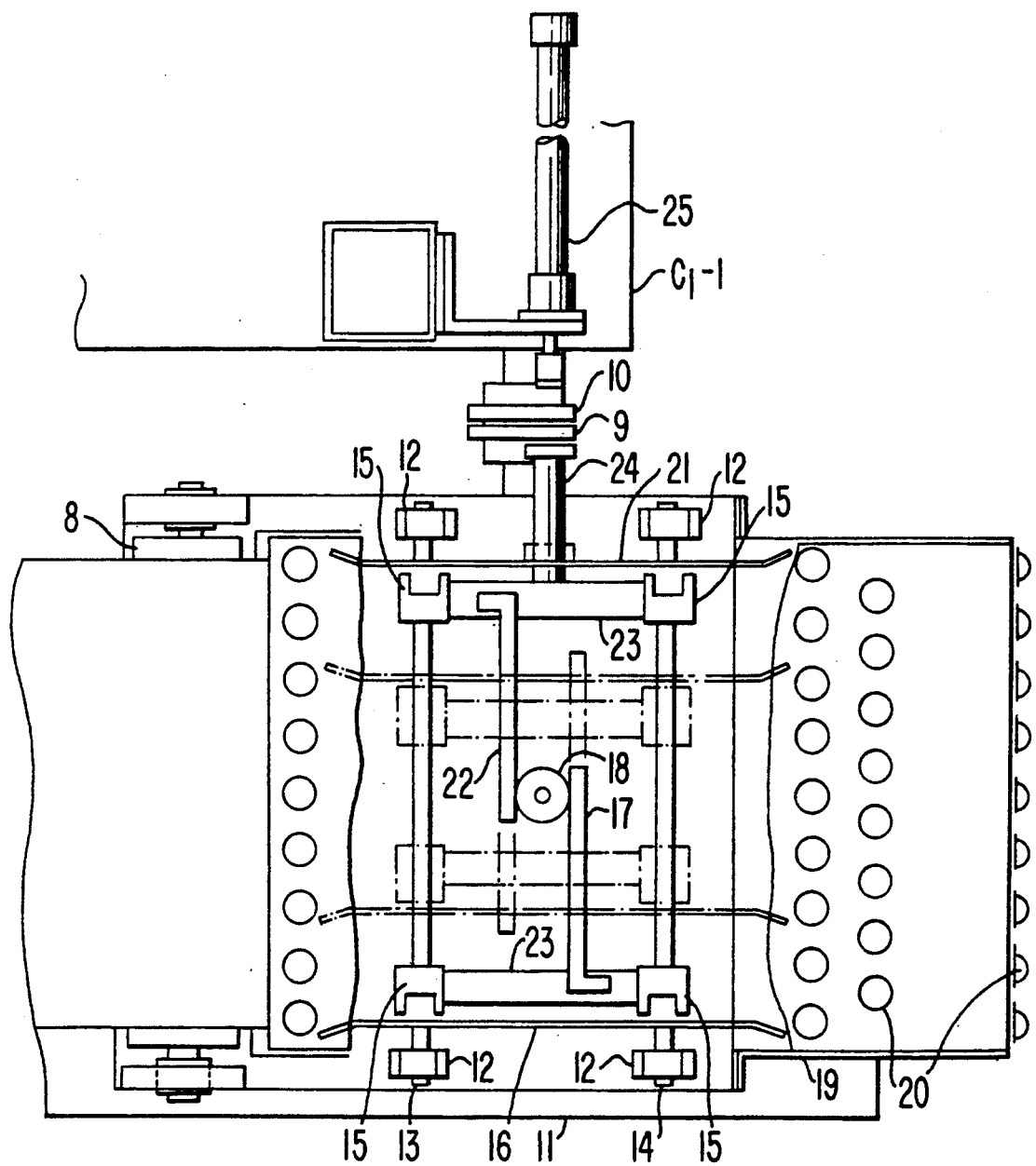
FIG. 6 is a plan view of the same.

FIGS. 5 and 6 are a side view and a plan view of a material aligning device for a material truck $C_1$-2 ($C_2$-2 and $C_3$-2 being similar).

In the following, as a representative one of the material trucks, the material truck $C_1$-2 will be described in greater detail. The material truck $C_1$-2 has the following structure. That is, the material truck $C_1$-2 comprises of a sled-shaped frame 1 which is favorable for sliding on the roller and ball bearings of the automatic material truck exchanger sub-system (III-1), bearings 2 fixedly provided on the frame 1, a material roll 5 in which a liner 3 and a material 4 are co-wound and which is rotatably supported by the bearings 2, a liner roll 7 disposed parallel to the material roll 5 and rotatably supported by the above-mentioned frame 1 via bearings 6, a separate roller 8 disposed midway between the aforementioned rolls 5 and 7 for separating the material 4 and the liner 3 from each other, and a material aligning device erected from the frame 1. The material roll 5 and the liner roll 7 are respectively provided with clutches 9 at their shaft ends so that when the material truck has been disposed at a predetermined position they can be connected to output shaft ends 10 of a material delivery device in the material feeder $C_1$. This state is also shown in FIG. 2.

The material aligning device has the following structure. That is, reference numeral 11 designates a flat plate supported by the above-mentioned frame 1, numeral 12 designates bearings fixedly provided on the flat plate 11, which support guide shafts 13 and 14, respectively, parallel to each other. On the above-mentioned guide shafts 13 and 14 are mounted slidable bearing boxes 15, guide plates 16 and 21 and racks 17 and 22. The respective racks mesh with a pinion 18 disposed at a central location, and the pinion 18 is biased by a spiral spring (not shown) so as to normally keep the above-mentioned guide plates 16 and 21 in an opened state (the state shown by solid lines). The flat plate 11 is integral with a plate 19 having a configuration adapted to the flow of the material 4 and bearings 20 which allow the material to slide thereover in various directions. The bearing boxes are connected by respective connecting rods 23, and at an appropriate position on the connecting rod 23, a rod 24 projects outwards and parallel to the guide rods 13 and 14. A cylinder 25 adapted to be arbitrarily urged against the end of the above-mentioned rod 24 is fixedly provided at an appropriate position on the material delivery device $C_1$-1.

With the above-described construction, the guide plates 16 and 21 for use in material alignment are normally opened sufficiently larger than the width of the material, and so, they do not hinder the flow of the material. However, at a necessary time if the cylinder 25 is extended to push the rod 24 against the resilient force of the above-mentioned spiral spring (not shown), the guide plates 16 and 21 can be moved so as to narrow the interval therebetween in a symmetric manner, with respect to the central location, by the action of the racks 17 and 22 and the pinion 18. Hence the leading end portion of the material at the beginning of use or the trailing end portion close to the end of use can be aligned correctly at a desired central position. And if the cylinder 25 is retracted, the guide plates 16 and 21 can be again brought into the opened state.

In FIG. 3 is shown an overall side view of the material feeder $C_1$ ($C_2$ and $C_3$ being similar). In this figure, the respective component members are as follows:

bb designates a centering and sticking device for a breaker ply, and a well-known device can be used therefor;

cc designates a material feed conveyor device (a first conveyor);

dd designates another material feed conveyor device (a third conveyor);

ee designates still another material feed conveyor device (a second conveyor);

ff designates yet another material feed conveyor device (a fourth conveyor);

gg designates a holding device for a trailing end of a material nearly at the end of use;

hh designates a suction device for a cut material; and ii designates a cutting device.

The holding device gg for the trailing end of the material nearly at the end of use is used to feed the material 4 delivered from the material truck $C_1$-2 up to the cutting device ii as will be described later via the fourth conveyor ff (shown in FIG. 3), also to hold by suction the portion nearly at the end of use of the material delivered from the material roll 5 in the material truck, and if a new material truck has been disposed and a leading end portion of a material in the beginning of use has been exposed, to splice the above-mentioned held end onto the leading end portion. When a new material truck is to be received, the holding device gg is turned up as shown by dash lines in FIG. 4 so that entrance of the truck may not be hindered.

In FIG. 5 is shown the relation between the material aligning device of the material truck and this holding device gg. In the following, the construction will be explained in greater detail with reference to FIG. 5.

The material trailing end holding device gg is constructed by equipping in the illustrated fashion a frame 30 that is swingable about a pivot provided at the end portion of the fourth conveyor ff, ball bearings 31 fixedly provided at the frame 30 and rotatable in every direction, longitudinal type rollers 32 which are adjustable in width intervals depending upon a width of a material, an arm 33 swingably mounted at the lower end of the frame 30, an appropriate number of vacuum pads 34 disposed at the free end portion of the arm 33, a cylinder 35 for swinging the above-described frame 30, and a cylinder 36 for swinging the aforementioned arm 33.

The state shown in FIG. 5 where the cylinders 35 and 36 are both contracted in length, is the state during a normal production operation. Whereas, the state where the cylinder 35 is in a contracted state (shown by solid lines) and the cylinder 36 is in an extended state (the arm 33 being shown by dash-dot lines in FIG. 3) is the state where the trailing end of the material is going to be sucked and held, or the state where the trailing end of the material which has been held by the arm 33 is going to be spliced with a leading end portion of a next new material and the hold is going to be released.

More particularly, if the material on the material truck being used becomes nearly end of use and the fact that the trailing end of the material has passed the location of the roll 8 on the material truck has been detected by a well-known optical sensor (not shown), then the cylinder 25 shown in FIG. 6 extends to narrow the interval between the guide plates 16 and 21, also the movements of the first, second, third and fourth conveyors in the material feeder are stopped, and simultaneously the material feed work from the material feeder is also stopped. Thereafter, material feed from the material truck is effected a little, and the material is paid out until the trailing end of the material comes to an appropriate position. When a well-known optical sensor (not shown) detects that the trailing end has come to the appropriate position, the arm 33 swings and sucks the materials by means of the vacuum cups 34, and then the arm 33 rises again.

Thereafter, the cylinder 35 extends, and the frame 30 and the arm 33 would swing while holding the material, would become the state shown by dash lines in FIG. 4, and waits for a new material truck coming in. When entry of a new material truck is finished, a new material is paid out and the above-mentioned optical sensor has detected the leading end of the new material, the feed of the new material is stopped, and similarly to the above-described operation, a material aligning device of the new material truck is actuated by the cylinder 25 to effect alignment of the leading end of the material.

Then the cylinder 35 is contracted, hence the arm 33 holding the trailing end of the old material is restored to the original position, subsequently the cylinder 36 extends to bring the arm 33 to the position shown by dash-dot lines in FIG. 3, and the trailing end of the old material is spliced by sticking to the leading end portion of the new material. Thereafter, the vacuum for the suction pads 34 is released, the arm 33 rises again, and the guide plates 16 and 21 are opened to take the positions not hindering the flow of the material.

According to the above-described method, the leading end of the new material and the trailing end of the old material can be spliced automatically, and manual works by a worker are not necessitated.

The cutting device ii is used in the work of cutting the material into a predetermined length for each tire during a normal production operation, and also in the work that after new and old material trucks were exchanged and the new and old materials were provisionally spliced in the portion of the material aligning device in the material truck, the front and rear of the spliced portion of the ends of the new and old materials are respectively cut, then the cut-out piece containing the spliced portion is thrown away externally of the apparatus, and thereafter the above-mentioned both cut end portions are regularly respliced.

In general, in the initial use portion and in the final use portion of a rolled material, the configuration of the material is unstable, especially in the case of a member containing steel cords, wires may be possibly exposed at the end surface, and often it is unfavorable to assemble the material in a tire in the original state. Therefore, the above-described splicing method and the cutting device according to the present invention are effective for avoiding such unfavorable results.

In the following, the construction of the cutting and splicing means will be explained in greater detail. The cutting device ii is constructed of the following component members (See FIG. 3):

Reference numeral 40 designates a frame which is fixedly erected at an appropriate position. Reference numeral 41 designates a cutter frame which is rotatably mounted on the frame 40 through a well-known method and which can be fixed at any arbitrary position depending upon a desired cutting angle. The cutter frame 41 comprises a motor 43 provided with a pulse generator 42, a gear 44 provided at one end of the shaft of the same motor, a straight track 45 fixedly secured to the cutter frame 41 a screw rod 46 mounted to the cutter frame 41 rotatably and in parallel to the track 45, a gear 47 at an end portion of the screw rod 46, a toothed belt 48 for coupling the gears 44 and 47, a nut 49 meshed with the screw rod 46, bearings 50 which are enabled to run along the track 45, and a movable frame 51 suspended from the bearings 50. The nut 49 is fixed at an appropriate position on the movable frame 51. The portion of the movable frame is shown in FIG. 7 in an enlarged scale.

Figure 7:
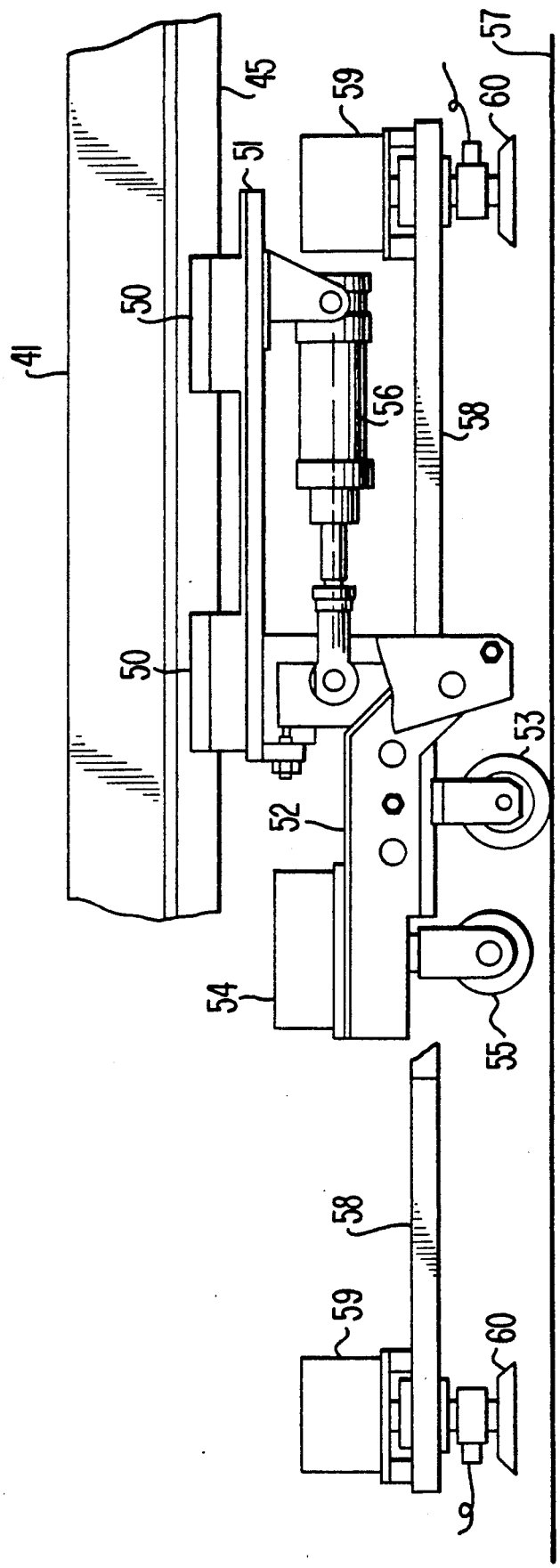
FIG. 7 is an enlarged side view of a movable frame of a cutting device.

With reference to FIG. 7, the movable frame 51 is provided with a swingable arm 52, a disc knife 53 rotatably mounted at an appropriate position on the arm 52, and a freely rotatable press roll 55 which is mounted at the tip end portion of the arm 52 so as to be vertically movable by means of a cylinder 54. The press roll 55 is disposed with its rotational axis held in parallel to the axis of the disc knife 53. By contracting a cylinder 56, the arm 52 can be brought into the condition where the disc knife 53 is not held in contact with a blade receiving pedestal 57. On the other hand, the cylinder 54 has a sufficient stroke for enabling the press roll 55 to move along the blade receiving pedestal 57 while being held in contact with the pedestal by extending when the arm 52 is positioned at the upper swing limit.

At an appropriate position of the movable frame 51, there is fixedly provided an arm 58 as directed in the traveling direction of the disc knife 53, and at appropriate positions of the arm 58 are provided vacuum pads 60 which are vertically movable by means of cylinders 59.

The vacuum pads 60 are favorable for carrying out a material piece cut out by the disc knife 53 externally of the apparatus, and they are disposed in multiple at appropriate positions in the vicinity of the cutting line. The press rolls 55 and the vacuum pads 60 are not used for a cutting work during a normal production, but they are used immediately after exchange of the new and old material trucks (the operations will be described later). A suction device hh for a cut-out material is not used upon cutting operation during a normal production operation, but when the new and old material trucks were exchanged and a spliced portion of the new and old materials that was spliced at the material aligning device on the material truck has reached the cutting device, the rear (that is, the side of the material truck) of the spliced portion is cut, thereafter the suction device hh is used to suck the rear portion and rise, subsequently to be retreated by a predetermined amount to the rear and to be made to stand by, and at an appropriate time, to advance again by the equivalent amount to the retreated amount, and to release the material at a predetermined position.

In the following, the construction will be explained in more detail. The frames 40 and 41 and the blade receiving pedestal 57 of the cutting device as well as the suction device hh including the third conveyor dd are shown in FIG. 8 (plan view) and in FIG. 9 (side view). In FIG. 10 is shown a side view in which the suction device is especially clarified.

In these figures, reference numeral 61 designates a frame fixedly provided at an appropriate position behind the third conveyor dd on the side of the fourth conveyor device ff, and the central portion of the frame 61 is connected with the central portion of the frame 40 through a frame 62, and a cylinder 63 is equipped above the frame 62. On the frame 61 is rotatably mounted an arm 64, at the opposite ends of the arm 64 are rotatably mounted arms 65 and 66, the other ends of which are rotatably mounted to the above-mentioned frame 41, and a parallelogram is formed by the above-described arms 64, 65 and 66 and one edge formed between the respective pivot points on the frame 41. On the lower surfaces of the aforementioned arms 65 and 66 are fixedly provided straight tracks 67 and 68, respectively, and there are provided movable frames 70 and 71 suspended via bearings 69. To the above-described movable frames 70 and 71 are rotatably mounted arms 72 and 73. For simplicity of illustration, the arm 73 is omitted in FIG. 10. The arms 72 and 73 are disposed in parallel to the aforementioned arm 64. Each of the arms 72 and 73 is provided with vacuum cups 76 which are disposed in multiple on an arm 75 that can be arbitrarily raised and lowered by means of cylinders 74. The lower limit level of the vacuum cups 76 moved by the cylinders 74 is chosen so as to be able to suck the material on the upper surface of the third conveyor dd. A rod end 77 of the above-described cylinder 63 is connected to an appropriate position on the aforementioned arm 73 via a rod 78. The vacuum cups 76 suspended from the arm 72 are located at the positions favorable for sucking the proximity of a cutting line of the material cut by the disc knife 53 on the blade receiving pedestal 57.

With the above-described construction, after cutting, the material on the rear side with respect to the cutting line can be retreated by a predetermined amount by means of the cylinder 63 by sucking the proximity of the cutting line therealong and a further rear portion and raising the same, and also it is possible to make the same portion advance again and to place it precisely at the initially sucked position.

In addition, even if the angle of the material to be cut should be changed depending upon various factors of a tire, the parallel position along the cutting line can be maintained although the cutting line and the suction positions would change a little. Furthermore, in the event that it becomes necessary to establish a predetermined relation between the cutting line and the suction positions, if the above-described cylinder is replaced by a well-known special cylinder which is controllable in position, then even when the various factors of the material including an angle are changed, it can be well dealt with. In FIG. 11 is shown a sequence of works of splicing an end of a used material on an old material truck with an end of a material in the beginning of use on a new material truck, and of removing the spliced portion and resplicing in the cutting device portion, in a simplified form as viewed from the above of the material aligning device portion and the cutting device portion.

Sequence of Works (See FIG. 11)

(a) The fact that a trailing end portion of a material 4 on an N-th material truck has come to the material aligning device portion, is detected by a first sensor, and feed of the material is once stopped. Reference numerals 16 and 21 designate guide plates of the N-th truck.

(b) After stoppage, the interval between the guide plates 16 and 21 is narrowed, and the material is aligned thereby. Furthermore, after alignment the material 4 is moved a little up to a second sensor, and stops there.

(c) The material is sucked by the vacuum pads 34, and subsequently the interval between the guide plates 16 and 21 is broadened. Next, the sucked material takes the state shown by dash lines in FIG. 4 as a result of swinging of the frame 30 and the arm 33.

(d) A new (N+1)-th material truck comes in and installed, and a material which has begun to be used is paid out from the material roll. At this moment, the guide plates 16 and 21 held opened. These guide plates are the guide plates of the (N+1)-th truck.

(e) The first sensor detects the fact that an end of the material has come to the material aligning device portion, hence the feed of the material is once stopped, subsequently the interval between the guide plates 16 and 21 is narrowed, and thereby the material is aligned. Next, the material advances a little until the second sensor detects the material.

(f) After stoppage, the trailing end of the material on the N-th material truck is restored to its original position, overlapped on the leading end portion of the material on the (N+1)-th material truck, and stuck thereto. Thereafter, the vacuum pads are released from suction and held at stand-by positions.

(g) At the same time, the interval between the guide plates 16 and 21 is broadened, and the material 4 advances by an appropriate distance to be used.

(h) The spliced portion of the material reaches the cutting device, and after passing the cutting position by an appropriate amount, the material stops. Reference numeral 57 designates a material receiving pedestal, and a dash-dot line indicates a line along which the material is going to be cut.

(i) The disc knife 53 is pressed and runs in the cutting direction to cut the material 4. Thereafter, the vacuum pads 76 suck the rear of the cutting line and rise.

(j) After rise, they retreat backwards.

(k) The material at the forth retreats, and when the spliced portion has sensed the intended cutting line, the material is stopped. Provision is made such that at this moment the material sucked by the vacuum pads 76 may not come into contact with the conveyor.

(l) The disc knife 53 is pressed and runs in the cutting direction to cut the material 4.

(m) Next, when the disc knife has returned to the center, the vacuum pads 60 suck the cut piece 4' including the spliced portion, rise, and again run in the cutting direction, and at an appropriate position, suction of the cut piece is released to discharge the cut piece.

(n) The end of the material which has been sucked and held, advances again, then it is lowered to be placed at the original position, and the hold by the vacuum pads 76 is released. The holding device retreats and takes a position not hindering the further operation.

(o) Subsequently, the press roll 55 is lowered and runs while pressing the materials, and thereby it splices the both materials along the cutting line.

It is to be noted that while the above description has explained one preferred embodiment that is pertinent to a breaker ply, the present invention is applicable to cutting of materials stocked in a rolled shape, regardless of whether steel cords are present within a material or not.

As will be apparent from the detailed description above, according to the present invention, exchange of material trucks, terminal end treatments of end portions of new and old materials, and even a splicing work between new and old materials, which relied upon human labor in the prior art, can be achieved entirely through an automatic operation, and so, an installation having a high productivity can be achieved.

While a principle of the present invention has been described above in connection with one preferred embodiment of the invention, it is intended that all matter contained in the above description and illustrated in the accompanying drawings shall be interpreted to be illustrative and not as a limitation on the scope of the invention.

What is claimed is:

1. A method of feeding material in a tire fabricating machine having a material feeder adapted to at least feed tire constituent material for use in tire production in the machine, said method comprising:

positioning a first material truck, having a roll of tire constituent material rotatably supported thereon, at the material feeder;

subsequently, providing a second material truck, having a new roll of tire constituent material rotatably supported thereon, at a standby location at the rear or to the side of the material feeder and aligned therewith;

feeding the roll of tire constituent material from the first material truck with the material feeder to carry out a tire production operation;

stopping said feeding of the roll of tire constituent material with the material feeder at a time before the tire constituent material is consumed during the tire production operation and at which time a trailing end of the tire constituent material is derived from the roll thereof;

holding the trailing end of the tire constituent material near the material feeder once said feeding of the roll of tire constituent material is stopped;

subsequently delivering the first material truck in a direction to the front, to the rear or to the side of the material feeder and away from the second material truck positioned at the standby location;

subsequently delivering the second material truck from the standby location to the material feeder;

unwinding the new roll of tire constituent material from the second material truck once at the material feeder to derive a leading end of the new roll;

superposing the held trailing end of the tire constituent material with the leading end of the new tire constituent material;

subsequent to said superposing, splicing the leading and the trailing ends together, and releasing the trailing end, to form a provisionally spliced portion of the tire constituent materials;

cutting the tire constituent materials to the front and to the rear of the provisionally spliced portion in the material feeder;

removing said provisionally spliced portion once it has been cut from the tire constituent materials by said cutting of the tire constituent materials, and subsequently discharging the provisionally spliced portion from the material feeder; and resplicing the tire constituent materials once the provisionally spliced portion has been removed therefrom.

2. A method as claimed in claim 1, wherein the step of holding is carried out by exerting suction on the trailing end.

3. A method as claimed in claim 1, and further comprising detecting when the provisionally spliced portion has reached a predetermined location in the material feeder, and wherein the step of cutting is initiated based on said detecting.

* * * * *